(12) United States Patent
Franchet et al.

(10) Patent No.: US 6,796,120 B2
(45) Date of Patent: Sep. 28, 2004

(54) ELECTROHYDRAULIC ACTUATOR

(75) Inventors: Michel Franchet, Pouilly-le-Fort (FR); Daniel Kettler, Chartrettes (FR); Pascal Lejeune, Avon (FR)

(73) Assignee: Snecma Moteurs, Paris (FR)

( * ) Notice: Subject to any disclaimer, the term of this patent is extended or adjusted under 35 U.S.C. 154(b) by 73 days.

(21) Appl. No.: 10/277,811

(22) Filed: Oct. 23, 2002

(65) Prior Publication Data

US 2003/0077183 A1 Apr. 24, 2003

(30) Foreign Application Priority Data

Oct. 24, 2001  (FR) .............................................. 01 13716

(51) Int. Cl.⁷ .............................................. F16D 31/02
(52) U.S. Cl. .......................................... 60/413; 60/475
(58) Field of Search .......................... 60/413, 473, 475, 60/476

(56) References Cited

U.S. PATENT DOCUMENTS

| | | | | |
|---|---|---|---|---|
| 2,680,952 A | * | 6/1954 | Hurkamp et al. .............. | 60/413 |
| 2,737,895 A | * | 3/1956 | Ferris .......................... | 92/12.2 |
| 3,534,551 A | * | 10/1970 | Tullio .......................... | 60/478 |
| 4,529,362 A | * | 7/1985 | Ichiryu et al. ............... | 417/271 |
| 4,630,441 A | * | 12/1986 | Chamberlain ................ | 60/413 |
| 4,850,812 A | * | 7/1989 | Voight ........................ | 417/271 |
| 5,117,633 A | * | 6/1992 | Bayer et al. .................. | 60/473 |
| 5,144,801 A | * | 9/1992 | Scanderbeg et al. .......... | 60/475 |
| 5,519,995 A | * | 5/1996 | Sasse et al. .................... | 60/476 |
| 6,543,223 B2 | * | 4/2003 | Muschong et al. ........... | 60/476 |

FOREIGN PATENT DOCUMENTS

| | | |
|---|---|---|
| CH | 386 854 | 1/1965 |
| DE | 1 175 057 | 7/1964 |
| DE | 1 273 948 | 7/1968 |

* cited by examiner

Primary Examiner—Thomas E. Lazo
(74) Attorney, Agent, or Firm—Oblon, Spivak, McClelland, Maier & Neustadt, P.C.

(57) ABSTRACT

An electrohydraulic actuator comprising: a hydraulic actuator comprising a piston secured to a member to be controlled and capable of moving in a cylinder under drive from a hydraulic fluid; a hydraulic pump feeding both faces of the piston with hydraulic fluid via channels integrated in the walls of the cylinder; an electric motor immersed in the hydraulic fluid, and controlled and powered electrically by an electronic control unit, driving the hydraulic pump in rotation; and a hydraulic accumulator for compensating variations in the volume of the hydraulic fluid; the hydraulic actuator, the hydraulic pump, the electric motor, and the hydraulic accumulator having a common axis of symmetry and being mounted in alignment in a common housing that is leaktight to the hydraulic fluid, thereby forming an axially symmetrical self-contained hydraulic assembly.

13 Claims, 3 Drawing Sheets

ELECTROHYDRAULIC ACTUATOR

FIELD OF THE INVENTION

The present invention relates to an electrohydraulic actuator that is particularly adapted to aviation use. It is thus suitable for use in aircraft to control flight control surfaces or variable pitch fan blades, for example.

PRIOR ART

Electrohydraulic actuators (EHA) are now well known. As shown in the functional diagram of FIG. 5, they essentially comprise a hydraulic actuator 1 for driving a controlled member 2, where the displacement of said member is a function of the speed and the direction of rotation of an electric motor 3 controlling the feed of oil to the actuator by means of a hydraulic pump 4 which is immersed in oil. A hydraulic accumulator 5 compensates for any variations in oil volume that result from the compressibility or the expansion of the oil, in particular under the effect of temperature. The electrical controls 6 and the supply of electrical power 7 are delivered to the actuator via an electronic control unit 8 which acts directly on the electric motor as a function of information concerning the position of the actuator as supplied by a sensor 9.

Structurally, such actuators are made up of a plurality of separate elements that are fitted to the sides of the actuator cylinder and that are connected by means of pipes that are usually flexible, but sometimes rigid, with the exception nevertheless of the motor and pump assembly which is generally integrated in a single housing. U.S. Pat. No. 4,529,362 is a good illustration of such a structure with an external hydraulic tank and actuator. Another embodiment of such an electrohydraulic actuator is disclosed in French patent No. 2 489 897 which shows a relatively compact hydraulic assembly comprising two adjacent portions, one comprising the actuator and its hydraulic directional control valve, the other combining the motor, the pump, and the accumulator. Although that better-integrated structure gives satisfaction overall in most industrial applications, in the context of aviation use, e.g. use requiring the assembly to be set into rotation or else requiring small radial extent, it presents drawbacks associated with its asymmetrical configuration (unbalanced configuration) that gives rise to high levels of vibratory stress.

OBJECT AND DEFINITION OF THE INVENTION

The present invention proposes to mitigate the drawbacks of prior art devices by means of a self-contained electrohydraulic actuator that is axially symmetrical and radially compact. A particular object of the invention is to propose an actuator that is balanced, so that said actuator can be set into rotation, for example in order to make it fit for certain particular uses in aviation.

These objects are achieved by an electrohydraulic actuator comprising: a hydraulic actuator comprising a piston secured to a member to be controlled and capable of moving in a cylinder under drive from a hydraulic fluid; a hydraulic pump feeding both faces of said piston with hydraulic fluid via channels integrated in the walls of said cylinder; an electric motor immersed in the hydraulic fluid, and controlled and powered electrically by an electronic control unit, driving said hydraulic pump in rotation; and a hydraulic accumulator for compensating variations in the volume of the hydraulic fluid; wherein said hydraulic actuator, said hydraulic pump, said electric motor, and said hydraulic accumulator have a common axis of symmetry and are mounted in alignment in a common housing that is leaktight to the hydraulic fluid, thereby forming an axially symmetrical self-contained hydraulic assembly.

This particular arrangement leads to an actuator structure that is highly simplified, fully integrated and thus particularly compact, and easy to implement and to replace because it is hydraulically self-contained. Risks of leakage are also greatly reduced because of the absence of any rotary couplings or pipework. Above all, the axial, in-line structure of this actuator makes it possible to eliminate all of the unbalance that is to be found in prior art devices and that is prejudicial to vibration-free operation should the actuator need to be set into rotation.

Preferably, the hydraulic pump is a swash-plate pump with axial pistons. The pistons move in a cylinder system which is rotatable about said common axis of symmetry, and said swash-plate is stationary and secured to said housing. This configuration of a rotary cylinder system makes it possible to avoid using check valves and thus to reduce simultaneously the number of parts, the weight, the size, and the risk of the actuator breaking down.

Said electric motor is preferably of the brushless type, having permanent magnets or being an asynchronous motor.

In an advantageous embodiment, said cylinder system of the hydraulic pump is integrated with said rotor of the electric motor. This configuration of the motor and pump assembly thus forms an integrated electrical pump.

Preferably, the hydraulic accumulator comprises a metal bellows assisted by a spring. It may be disposed axially beneath said pump body or in said actuator cylinder. Advantageously, the actuator of the invention further comprises balancing means for eliminating the unbalance caused by the swash-plate when the actuator is set into rotation.

BRIEF DESCRIPTION OF THE DRAWINGS

The characteristics and advantages of the present invention appear better from the following description made by way of non-limiting indication and with reference to the accompanying drawings, in which.

DETAILED DESCRIPTION OF PREFERRED EMBODIMENTS

Figure 1:
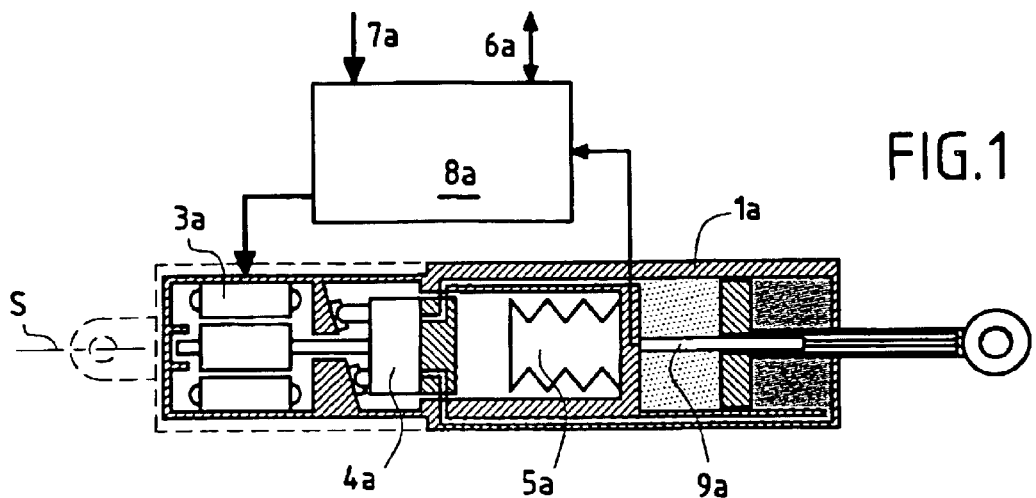
FIG. 1 is a theoretical diagram showing the functional structure of a first embodiment of an electrohydraulic actuator of the invention.
Figure 2:
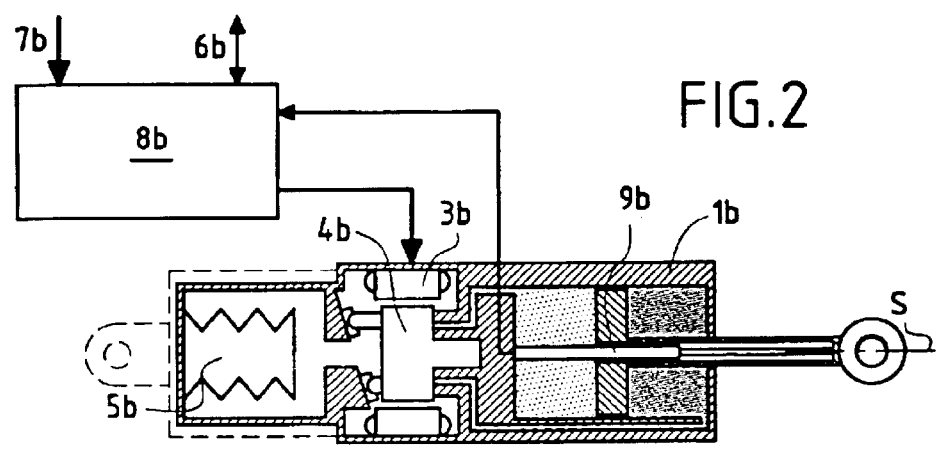
FIG. 2 is a theoretical diagram showing the functional structure of a second embodiment of an electrohydraulic actuator of the invention.

FIGS. 1 and 2 are two theoretical diagrams of an electrohydraulic type actuator which, in accordance with the invention, is in the form of a self-contained hydraulic assembly that is axially symmetrical in which the hydraulic actuator 1a or 1b, the hydraulic pump 4a or 4b, the electric motor 3a or 3b, and the hydraulic accumulator 5a or 5b constituting the actuator share a common axis of symmetry S and are mounted in alignment in a common housing that is leakproof between the external environment and the inside in which hydraulic fluid circulates in a closed circuit. In the diagram of FIG. 1, the accumulator is located axially in the actuator cylinder, whereas in the diagram of FIG. 2 it is located axially beyond the pump body. As in the prior art, the electrical controls 6a or 6b and the supply of electrical power 7a or 7b are delivered to the actuator via an external electronic control unit 8a or 8b which acts directly on the electric motor as a function of information concerning the position of the actuator as supplied by a sensor 9a or 9b.

Figure 3:
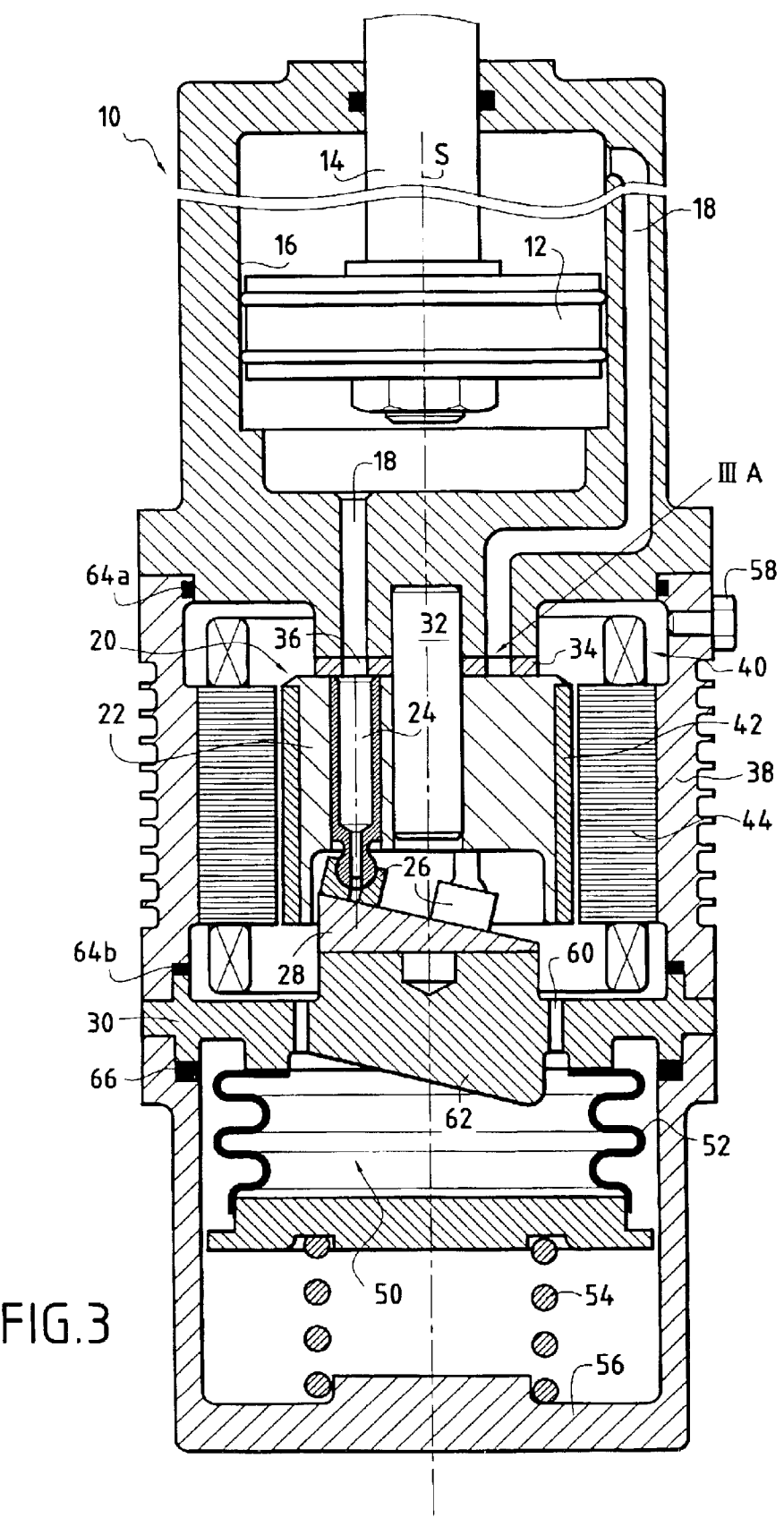
FIG. 3 shows a first physical structure of an electrohydraulic actuator of the invention.
Figure 3A:
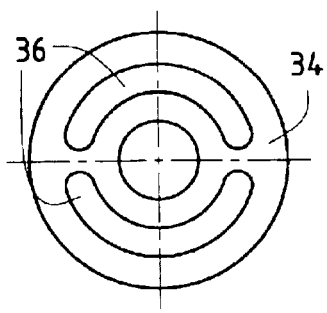
FIG. 3A is a detail view of FIG. 3.

A first embodiment of an actuator in accordance with the invention is shown in FIG. 3. The actuator comprises a hydraulic actuator 10 having a piston 12 whose rod 14 is secured to a member that is to be controlled (not shown), for example a ring for controlling and synchronizing the propeller blades of a turboprop, as illustrated in the patent application filed together with the present application and entitled (in translation) "An electrohydraulic device for changing propeller pitch". The piston can move along its longitudinal axis in a cylinder 16 under drive from a hydraulic fluid delivered by a hydraulic pump 20 which feeds hydraulic fluid to both faces of the piston via channels 18 integrated directly in the wall of the actuator cylinder.

The hydraulic pump that is well known in the field of this art is preferably a conventional high pressure hydraulic pump having a stationary swash-plate and a rotating cylinder system containing axial pistons that rotate together with the cylinder system. The cylinder system 22 is itself cylindrical in shape and, in conventional manner, it is pierced by a plurality of through bores (at least three such bores), each of which slidably receives a hollow piston 24 having a spherical head that rests in a housing of complementary shape in a bearing shoe 26 that slides on the slope of the top surface of the stationary swash-plate 28 which is secured by crimping in a separator cover 30. By turning about its stationary axle pin 32, the cylinder system 22 drives the axially hollow pistons so that they move up or down by sliding on the slope of the stationary swash-plate, thereby causing them to draw in and discharge the hydraulic fluid which circulates round a closed circuit inside the electrohydraulic actuator, acting on both faces of the piston via a stationary distribution face 34 provided with kidney-shaped oil flow ports 36 placed between the cylinder system 22 and the channels 18 of the actuator.

The axle pin 32 for the cylinder system of the pump is a force-fit in the cylinder of the actuator. The pistons are hollow to enable the hydraulic fluid under pressure to create a film of fluid between the spherical head of the piston and its bearing shoe, and another film of fluid between the swash-plate and the bearing shoe so as to avoid metal-on-metal contact and thus reduce wear. The cylindrical envelope 38 of the pump casing is advantageously provided with cooling fins on its outside face.

Figure 5:
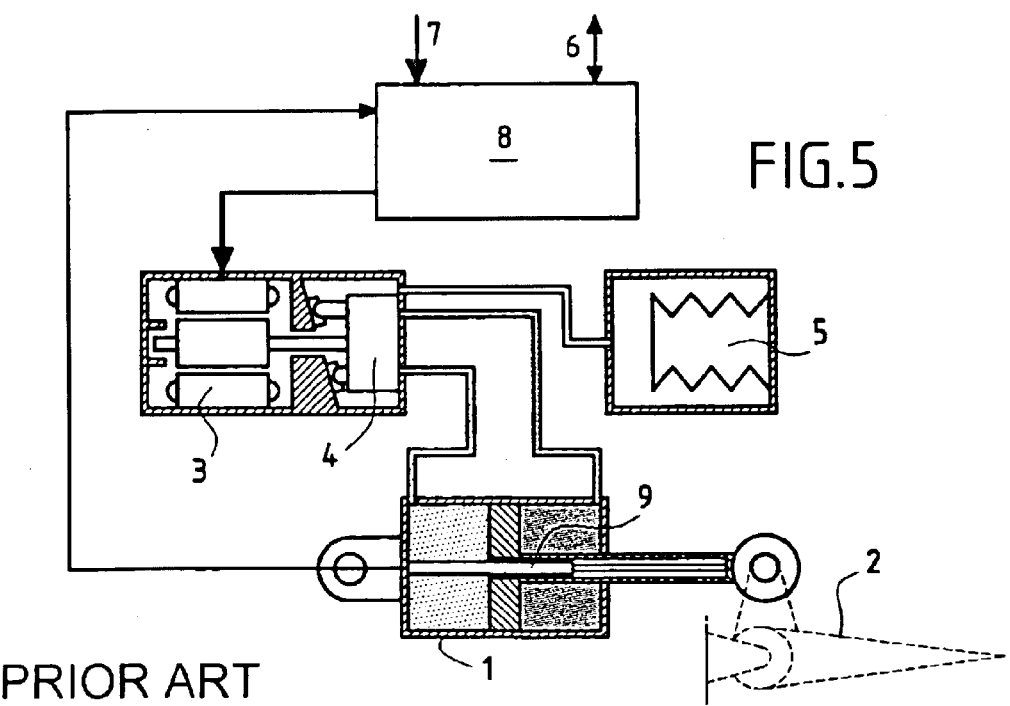
FIG. 5 is a diagram showing the functional structure of a prior art electrohydraulic actuator.

An electric motor 40 immersed in the hydraulic fluid, preferably a motor of the brushless type (thus not requiring maintenance), is controlled and powered electrically from an external electronic control unit (not shown) to drive the cylinder system 22. For this purpose, the cylinder system is secured at its periphery to permanent magnets or to a squirrel cage (for an asynchronous motor) 42 so as to form the rotor of the electric motor, with the coil-carrying stator 44 being conventionally placed around the rotor to leave an annular gap between itself and the rotor. Made in this way, the motor-and-pump assembly constitutes an integrated electrical pump presenting savings in weight and bulk compared with a more conventional configuration as two distinct elements (as shown in FIG. 5). In conventional manner, the external electronic control unit manages the electrical power (electricity feed) and the electronic control signals applied to the electric motor (speed and direction of rotation).

A hydraulic accumulator 50 as is well known in the art is mounted beneath the body of the integrated electrical pump, being fixed beneath the separator cover 30 in order to compensate for variations in the volume of the hydraulic fluid due to its compressibility or to expansion (for example because of temperature changes or because of any leaks). This accumulator is constituted by a metal bellows 52 assisted in the example shown by a spring 54 which bears against the end of the accumulator housing 56 so as to maintain pressure, but it is also possible to envisage it being assisted by gas under pressure.

Fluid is introduced into the actuator, and the system is purged once and forever in the workshop during assembly via a filler valve or plug 58 that is easy to use, preferably being situated in the pump casing 36. The hydraulic fluid in the accumulator penetrates into the pump cylinder via admission orifices 60.

If the actuator as a whole is to be set into rotation, the separator cover 30 includes a balance weight 62 countering the unbalance caused by the swash-plate 28. It is also possible to drill blind balancing holes (not shown) beneath the swash-plate. Sealing rings 64a, 64b, and 66 are advantageously disposed at the joints between the actuator cylinder, the pump casing, the separator cover, and the accumulator housing.

Figure 4:
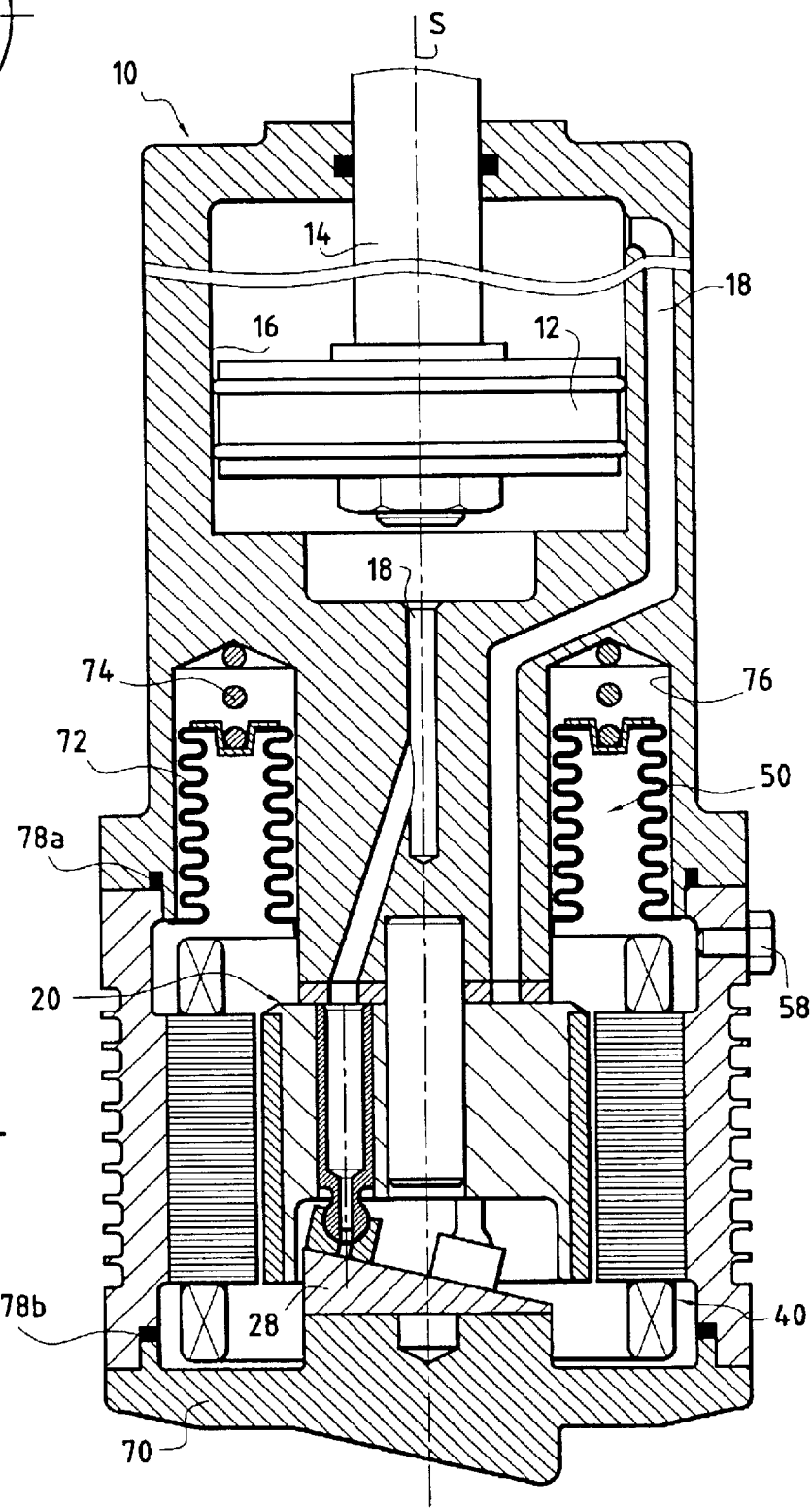
FIG. 4 shows a second physical structure of an electrohydraulic actuator of the invention.

A second embodiment of the invention in which the hydraulic accumulator 50 is directly integrated in the actuator cylinder 10 is shown in FIG. 4. Elements common to both embodiments are given the same references.

In this embodiment, the swash-plate 28 is fixed directly on an end wall constituted by a leaktight cover 70. The accumulator 50 is likewise constituted by an annular metal bellows 72 assisted by a spring 74 which this time bears against the bottom of an internal annular groove 76 formed in the actuator cylinder around the common axis S.

This configuration presents the advantage of not requiring the accumulator to be disassembled in order to change the electrical pump, and it possesses only two sealing rings 78a and 78b. The cover 70 may be fitted as before with a balance weight of identical shape to the swash-plate in order to compensate for the unbalance it causes in the event of the electrohydraulic actuator being used under circumstances where it is rotated as a whole.

Each of the embodiments of the electrohydraulic actuator as described above operates in similar manner, as follows.

In conventional manner, when the electric motor 40 rotates (i.e. when its stator is excited), the cylinder system drives the actual pistons 24 which slide because of their bearing shoes 26 engaging the top face of the swash-plate 28, thus causing the axial pistons to reciprocate. In the drawing-in direction, the axial pistons move down towards the swash-plate whereas in the delivery direction they move up under thrust from the swash-plate. The distribution plate 34 and the channels 18 integrated in the actuator cylinder deliver or return the hydraulic fluid which is put under pressure or suction on opposite faces of the piston 12 as a function of the direction in which the electric motor is rotating. The actuator moves when the pump delivers the fluid required to one face of the piston and draws it away from the other face. A high speed of rotation for the motor corresponds to the actuator moving at high speed, and the length of time the motor operates determines the length of the displacement. Changing the direction of rotation of the electric motor changes the direction in which the actuator is displaced. This axially symmetrical self-contained actuator structure having no flexible or rigid pipes and no couplings, can be operated in any position without running the risk of unpriming the pump, since the assembly is completely airtight. In addition, since the hydraulic fluid flows around a closed circuit it remains constantly under pressure from the accumulator and there is no need to proceed with regular top-ups of fluid.

The immersed motor of the integrated electrical pump makes it possible to eliminate the dynamic joints required when the pump and the motor are separate, and also improves reliability and facilitates maintenance.

What is claimed is:

1. An electrohydraulic actuator comprising:
   a hydraulic actuator comprising a piston secured to a member to be controlled and capable of moving in a cylinder under drive from a hydraulic fluid;
   a swash-plate pump comprising a cylinder system containing axial pistons and a swash-plate for feeding both faces of said piston with hydraulic fluid via channels integrated in the walls of said cylinder;
   an electric motor immersed in the hydraulic fluid, and controlled and powered electrically by an electronic control unit, driving said hydraulic pump in rotation;
   a hydraulic accumulator for compensating variations in the volume of the hydraulic fluid; and
   balance means for eliminating the unbalance caused by the swash-plate when the actuator is set into rotation;
   wherein said hydraulic actuator, said swash-plate pump, said electric motor, and said hydraulic accumulator have a common axis of symmetry and are mounted in alignment in a common housing that is leaktight to the hydraulic fluid, thereby forming a balanced axially symmetrical self-contained hydraulic assembly.

2. An actuator according to claim 1, wherein said cylinder system is mounted to rotate about said common axis of symmetry, said swash-plate being stationary and secured to said housing.

3. An actuator according to claim 2, wherein said cylinder system of the swash-plate pump is secured to permanent magnets or to a squirrel cage so as to form an electric motor rotor and so as to co-operate with an electric motor stator to form an integrated electrical pump.

4. An actuator according to claim 1, wherein said electric motor is of the brushless type, having permanent magnets or being asynchronous.

5. An actuator according to claim 1, wherein said hydraulic accumulator is axially integrated in the cylinder of the actuator.

6. An actuator according to claim 1, wherein said hydraulic accumulator is disposed axially beyond said pump body.

7. An actuator according to claim 1, wherein said hydraulic actuator, said swash-plate pump, said electric motor, and said hydraulic accumulator are set into rotation around said common axis of symmetry so as to rotate said member secured to said piston.

8. An actuator assembly comprising:
   an actuator including a piston and a cylinder;
   a pump in fluid communication with said cylinder;
   a motor configured to drive said pump;
   an accumulator in fluid communication with said pump, wherein said actuator, said pump, said motor, and said accumulator have a common axis of symmetry; and
   a balance weight having at rest an asymmetric weight distribution around said common axis and configured to compensate at least for a portion of said pump having at rest an asymmetric weight distribution around said common axis.

9. The actuator of claim 8, wherein said actuator, said pump, said motor, and said accumulator are mounted in alignment in a common housing.

10. The actuator of claim 9, wherein said common housing is leaktight to a hydraulic fluid.

11. The actuator of claim 8, wherein said portion of said pump having an asymmetric weight distribution around said common axis of rotation is a swash-plate.

12. The actuator of claim 8, wherein said portion of said pump having an asymmetric weight distribution around said common axis of rotation is a fixed portion relative to said piston.

13. The actuator according to claim 8, wherein said piston is coupled to a part of an aircraft, and said pump, said motor, and said accumulator are set into rotation around said common axis of symmetry so as to rotate said part of said aircraft.

* * * * *